United States Patent [19]

Brimacombe

[11] Patent Number: 5,237,583
[45] Date of Patent: Aug. 17, 1993

[54] EXCIMER LASER ASSEMBLY AND AN OPTIC MOUNT THEREFOR

[75] Inventor: Robert K. Brimacombe, Kanata, Canada

[73] Assignee: Lumonics Inc., Kanata, Canada

[21] Appl. No.: 783,234

[22] Filed: Oct. 28, 1991

[51] Int. Cl.$^5$ .................... H01S 3/22; H01S 2/223
[52] U.S. Cl. .................... 372/57; 372/99; 372/107
[58] Field of Search .................... 372/57, 107, 99

[56] References Cited

U.S. PATENT DOCUMENTS

| | | | |
|---|---|---|---|
| 4,679,204 | 7/1987 | Koseki | 372/107 |
| 4,680,771 | 7/1987 | Koseki | 372/107 |
| 4,777,639 | 10/1988 | Whitehouse | 372/107 |
| 4,951,285 | 8/1990 | Cole et al. | 372/107 |

*Primary Examiner*—John D. Lee
*Assistant Examiner*—Robert E. Wise

[57] ABSTRACT

The problems of maintaining proper alignment of the mirrors of an excimer laser in the face of thermal and pressure distortions of the ends of the laser vessel and when replacing the mirrors after removal for cleaning are overcome by mounting the mirrors on a separate, fixed supporting frame that is not influenced by movement of the vessel ends. The mounts nevertheless serve to connect the mirrors to the respective vessel ends so as to seal the pressurized gases in the vessel interior from the exterior. This sealing connection is a yielding one that permits relative movement between the vessel ends and the mirrors and hence avoids affecting the alignment of the mirrors. The mounts also include provision for ensuring that, after removal and replacement, wedge shaped mirrors are correctly realigned in respect of rotation about the axis of the laser beam, and that the mirrors can be replaced with their reference surfaces in exactly the original plane.

26 Claims, 6 Drawing Sheets

EXCIMER LASER ASSEMBLY AND AN OPTIC MOUNT THEREFOR

FIELD OF THE INVENTION

The invention relates to an excimer laser assembly having a novel optic mounting arrangement therein, and to the mount itself.

BACKGROUND OF THE INVENTION

Every excimer laser requires at least two mirrors, namely a rear mirror and a front mirror. When these mirrors are directly connected to a laser vessel to seal the same, the rear mirror typically consists of an element of suitable transparent material (such as quartz, magnesium fluoride or calcium fluoride), the outer surface of which, i.e. the surface more remote from the lasing cavity, is coated to be substantially fully reflective. The front mirror is a similar element of similar material, but whose outer surface is coated to be only partly reflective to ensure sufficient round trips of the beam in the lasing cavity, while being mainly transmissive to provide the output beam. An alternative technique uses two transparent windows to seal the vessel, while mounting front and rear mirrors external to the windows. In each case accurate alignment of the mirrors is essential for efficient operation of the laser and for ensuring an accurate pointing direction of the output beam towards a target.

For the purposes of this specification including the claims, the term "mirror" is used to denote the elements that provide the optical feedback to the laser cavity, i.e. they reflect at least a portion of the laser beam back along the laser axis, whether or not they also serve the function of sealing the laser vessel; the term "window" is used to denote the essentially transparent elements that may instead be used for sealing the laser vessel; and the term "optic" is used generically to refer both to such mirrors and windows.

In many other (i.e. not excimer) lasers, the mirrors are mounted, adjusted and firmly fixed in place by the manufacturer, and they continue to serve both optical and sealing functions for the life of the laser without requiring any further adjustment or attention by the user.

Excimer lasers, however, present special problems in this respect.

First, by virtue of the fact that an excimer laser is operated as a closed system (no gas flowing in or out during operation) and at a superatmospheric pressure, e.g. about 4 atmospheres, the inevitable temperature and pressure variations in the laser vessel set up such distortions and strains in the vessel that the ends of the vessel are caused to vary in position relative to each other and hence upset the alignment of mirrors mounted at these ends. One proposal for overcoming this problem employs the alternative technique mentioned above and mounts the mirrors on a rigid frame external to and mechanically independent of the end portions of the laser vessel, the function of sealing the vessel ends being taken over by the transparent windows. This use of four optics, two mirrors and two windows, has the disadvantage that it reduces the output power of the laser by typically about 20%.

The second problem presented by excimer lasers resides in the fact that the impurities generated in the laser vessel during operation necessitate frequent cleaning, typically at least once a week, of the surfaces of the mirrors or windows that are in contact with the gases in the laser vessel. Hence it is impossible for the manufacturer to adjust and fix all these optics permanently in place. The user has to be able to remove the optics (mirrors or windows) for cleaning and remounting or replacement with a new optic, while retaining the correct original orientations. It is thus important to provide mounts for the optics that are of such a nature that the user, who lacks the equipment or expertise for accurate realignment of the optics, can readily remove and replace the optics without a loss of alignment.

The alignment that has been under consideration so far concerns the adjustment of the axis of the laser beam in the Y and Z directions, where the X direction is the axis of the laser cavity and all these three directions are mutually perpendicular. In almost all excimer lasers each optic or at least one of them is formed with a wedge, i.e. is in the shape of a wedge with an angle between its inner and outer surfaces. While this angle is small, typically only about 20 milliradians or less (and is not normally discernable by eye), rotation of an optic by 180° about the X axis, i.e. complete reversal of the wedge slope, represents a serious optical misalignment. Even rotation of an optic around the X axis by much less than 180° is undesirable, and hence an optic mount is needed that is foolproof in the sense of only being capable of reassembly in the same orientation in respect of rotation about the X axis.

SUMMARY OF THE INVENTION

The objective of the present invention is to provide structures that avoid (or at least minimize) the foregoing problems.

To this end, in one aspect, the invention can be seen as an excimer laser assembly comprising a laser vessel with a pressurized interior containing a lasing cavity and a pair of mirrors aligned with each other and with the cavity and located at opposite ends of the vessel for producing a laser beam; a supporting frame; and a mount for each mirror. Each mount comprises a main member secured to the supporting frame, and removable and replaceable means for ensuring accurate relocation of its associated mirror in a predetermined orientation relative to the main member, such orientation being independent of movement of the vessel ends.

In the preferred form of the invention, these means for ensuring accurate relocation of the mirror in a predetermined orientation relative to the main member comprise a second member on which the mount for the mirror is secured in a fixed orientation, and means for adjusting the position of the second member relative to the main member in two mutually perpendicular directions both perpendicular to the laser beam.

The assembly may include means sealingly and yieldingly connecting each mount to a laser vessel end with an inside surface of the mirror in communication with the interior of the vessel.

In most instances, at least one of the mirrors or windows will have a pair of opposite faces that lie in planes slightly inclined to each other so as to define a wedge. In this case the mount for this wedge optic will preferably include means for so locating the optic therein that the wedge has a predetermined rotational orientation about the X axis.

When the alternative technique referred to above is employed the invention provides a laser assembly that has both a pair of windows at opposite ends of the vessel for sealing it, and a pair of mirrors located outside the windows. The mirrors, windows and laser cavity are aligned for producing a laser beam. In this embodiment of the invention each mirror is mounted on a supporting frame, while each window is mounted on a respective vessel end. As before, the mounts are preferably each such as to include means for ensuring accurate relocation of an optic (mirror or window) in a predetermined orientation relative either to the supporting frame (in the case of a mirror) or to a vessel end (in the case of a window).

The invention also relates to an optic mount per se for use in an excimer laser, i.e. a mount for supporting either a mirror or a window.

DETAILED DESCRIPTION OF THE PREFERRED EMBODIMENTS

Figure 3:
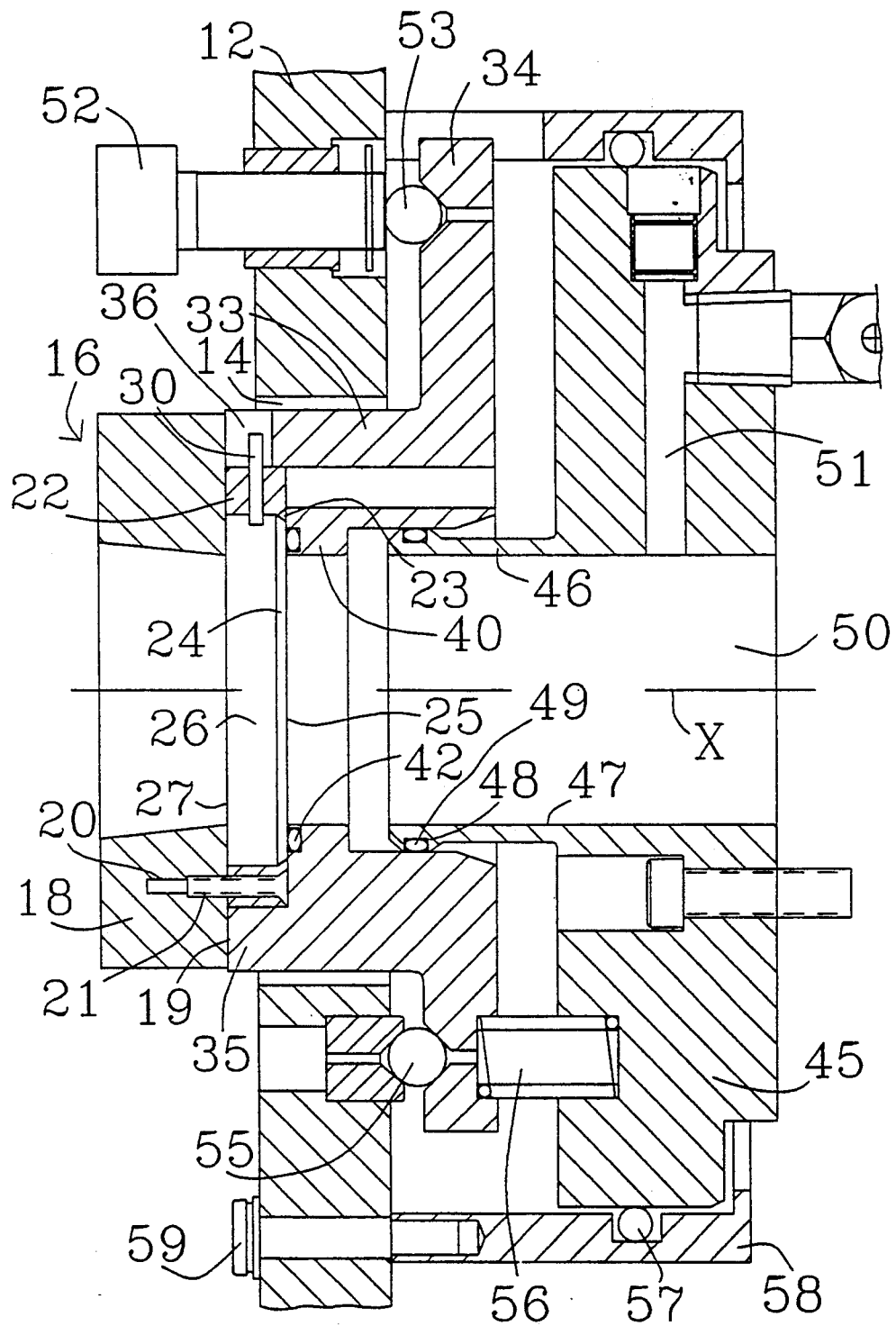
FIG. 3 is the central portion of FIG. 2 on a larger scale.
Figure 4:
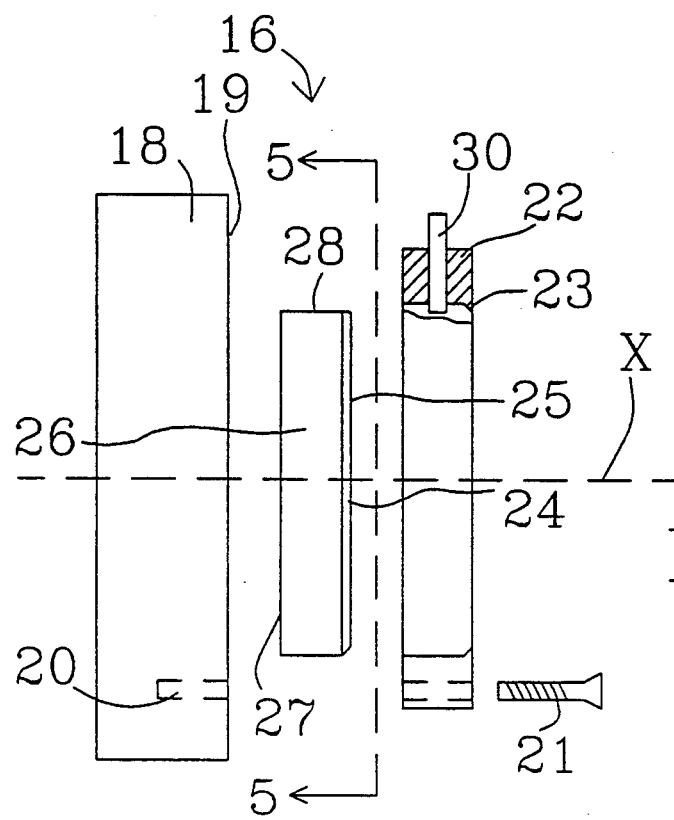
FIG. 4 is an exploded view of a holder formed of some of the elements of FIG. 3.

The optic mount 10 (FIGS. 1 and 2) consists of a main member in the form of a rigid metal plate 12 that has a central, circular hole 14 in which an optic holder 16 is located. As best seen in FIGS. 3 and 4, the holder 16 comprises a rigid metal ring 18, the inner surface 19 of which has holes 20 for receiving screws 21 that pass through an annulus 22 of plastic material that has a sloping, radially inwardly projecting annular flange 23 on its axially inner edge. This flange 23 engages an annular chamfer 24 on the inner surface 25 of a typical wedged mirror 26. Tightening of the screws 21 holds the mirror 26 with the periphery of its flat outer surface 27 pressed by the flange 23 firmly against a flat peripheral portion of the inner surface 19 of the ring 18. The fact that it is this outer surface 27 that is thus held firmly against the ring 18 of the holder 16 means that adjustments to the orientation of the mirror 26 are referenced entirely in relation to its outer surface. Such referencing of the outer mirror surface to the support frame is more tolerant of minor wedge angle variations between mirrors, when one is replaced by another, than if the inner mirror surface were the reference surface.

Figure 5:
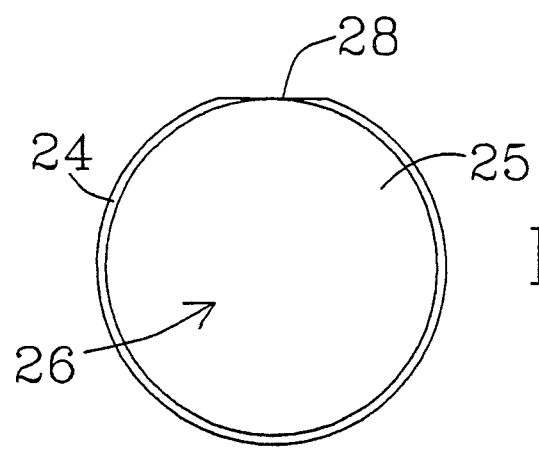
FIG. 5 is a view on the line 5—5 in FIG. 4.

As best seen in FIG. 5, the circularity of the mirror 26 is interrupted by a flat 28 that, when the mirror 26 has the correct predetermined rotational orientation about the laser axis X, is engaged by the lower end of a pin 30 secured in the periphery of the annulus 22 to provide registration means to prevent rotation of the mirror 26 about the X axis.

Figure 6:
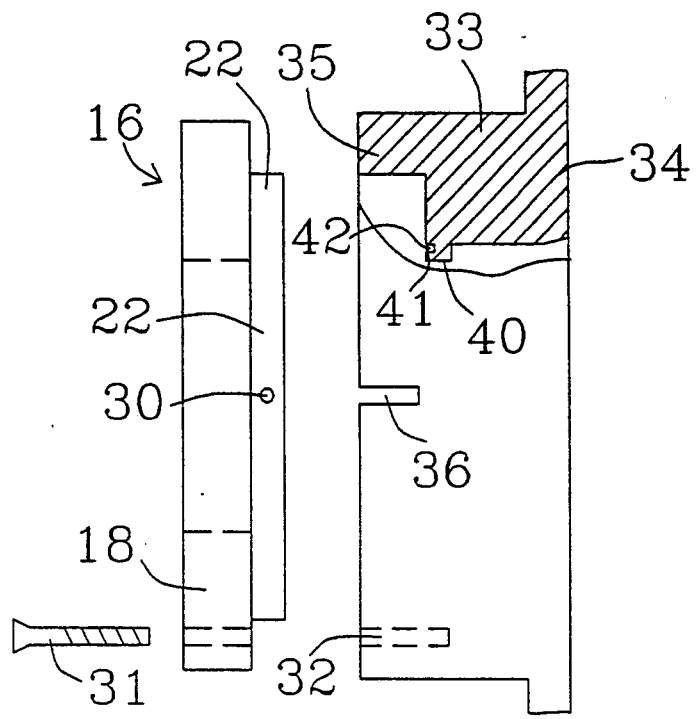
FIG. 6 is an exploded view (seen from above) of the holder of FIG. 4 after assembly, and a partly sectioned view of a boss portion of a plate with which such holder is in turn to be assembled.

With the holder 16 thus firmly assembled so that the mirror 26 is held in a fixed orientation relative both to rotation about the axis X and to movement in the directions Y and Z (FIG. 1), such holder 16 is secured by three screws 31 (FIG. 6) that pass through the ring 18 into threaded holes 32 in a boss portion 33 of an inner rigid metal member, i.e. a plate 34. The boss portion 33 has an axially projecting flange 35 that, in the assembled condition, tightly surrounds the outer periphery of the annulus 22 and has a slot 36 for receiving an outwardly projecting part of the pin 30, hence ensuring the correct rotational orientation about the X axis of the annulus 22 (and thus of the mirror 26) relative to the plate 34. A radially inwardly projecting flange 40 of the boss portion 33 is formed with an axially facing groove 41 in which an elastomeric O-ring 42 is located. As seen in FIG. 3, this O-ring presses against the inner surface 25 of the mirror 26 to provide a seal between the exterior and this inner surface which is in communication with the pressurized gases in the interior of the laser vessel.

Figure 2:
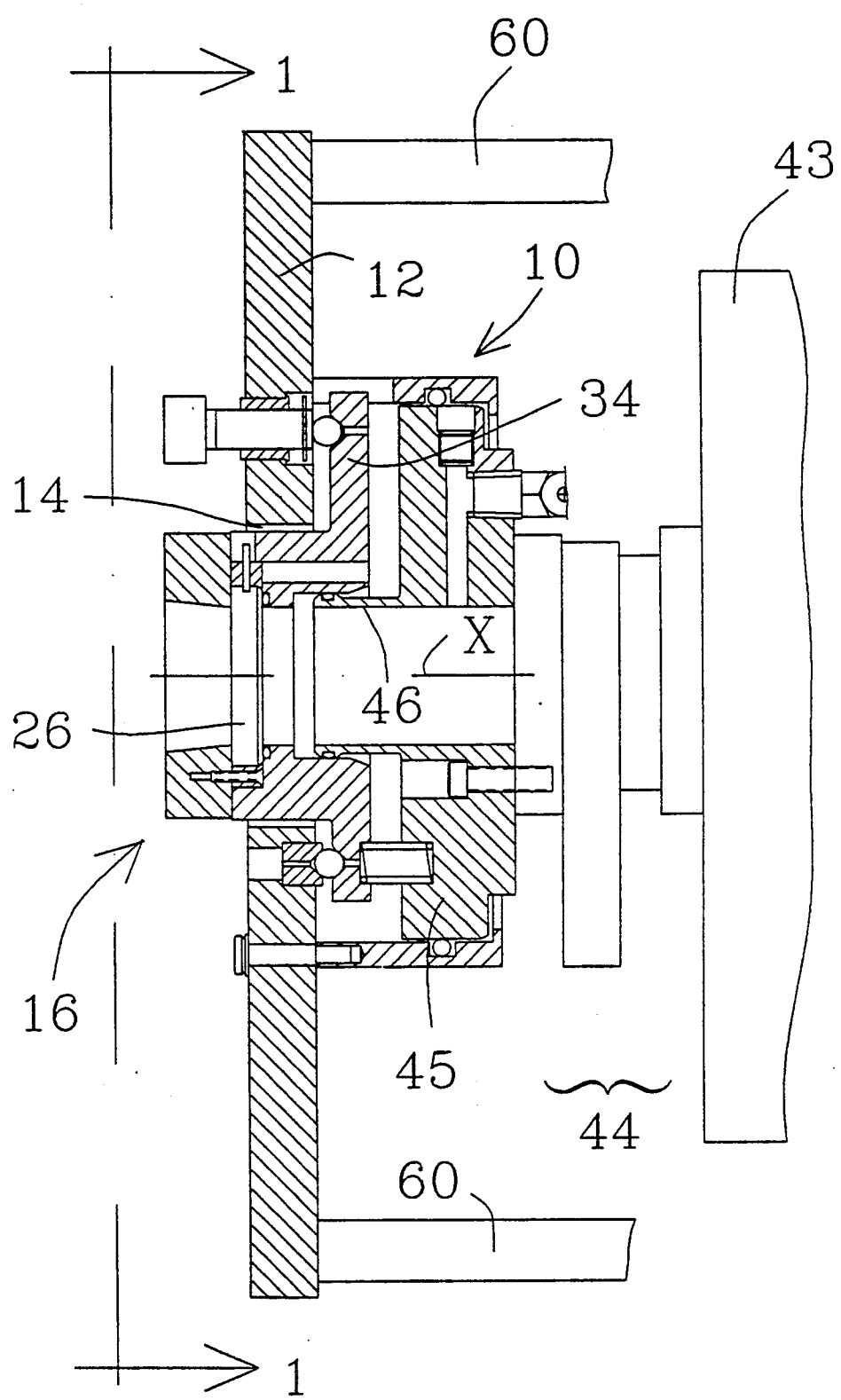
FIG. 2 is a section on the line 2—2 in FIG. 1, with certain further parts shown in elevation.

As best seen in FIG. 2, the laser vessel 43 has a gate valve 44 and another end fitting 45 that terminates in a projecting sleeve 46 (see also FIG. 3) that enters the boss 33. The outer periphery of the tip 47 of the sleeve 46 is formed with a radially outwardly facing groove 48 that contains an elastomeric O-ring 49. This arrangement affords a yielding connection between the boss 33 and the sleeve 46, so that axial and rotational movements of the sleeve 46 are not transmitted to the boss 33 and hence not transmitted to the holder 16 or the mirror 26 therein. Nevertheless, the O-ring 49 provides a pressure seal between the exterior and the conduit 50 formed within the sleeve 46, which conduit communicates with the interior of the laser vessel 43 and serves for passage of the laser beam. The fitting 45 also serves for passing lasing gases into and out of the laser vessel through passage 51 and the conduit 50. Since the parts 44 and 45 are known, they will not be further described.

Figure 1:
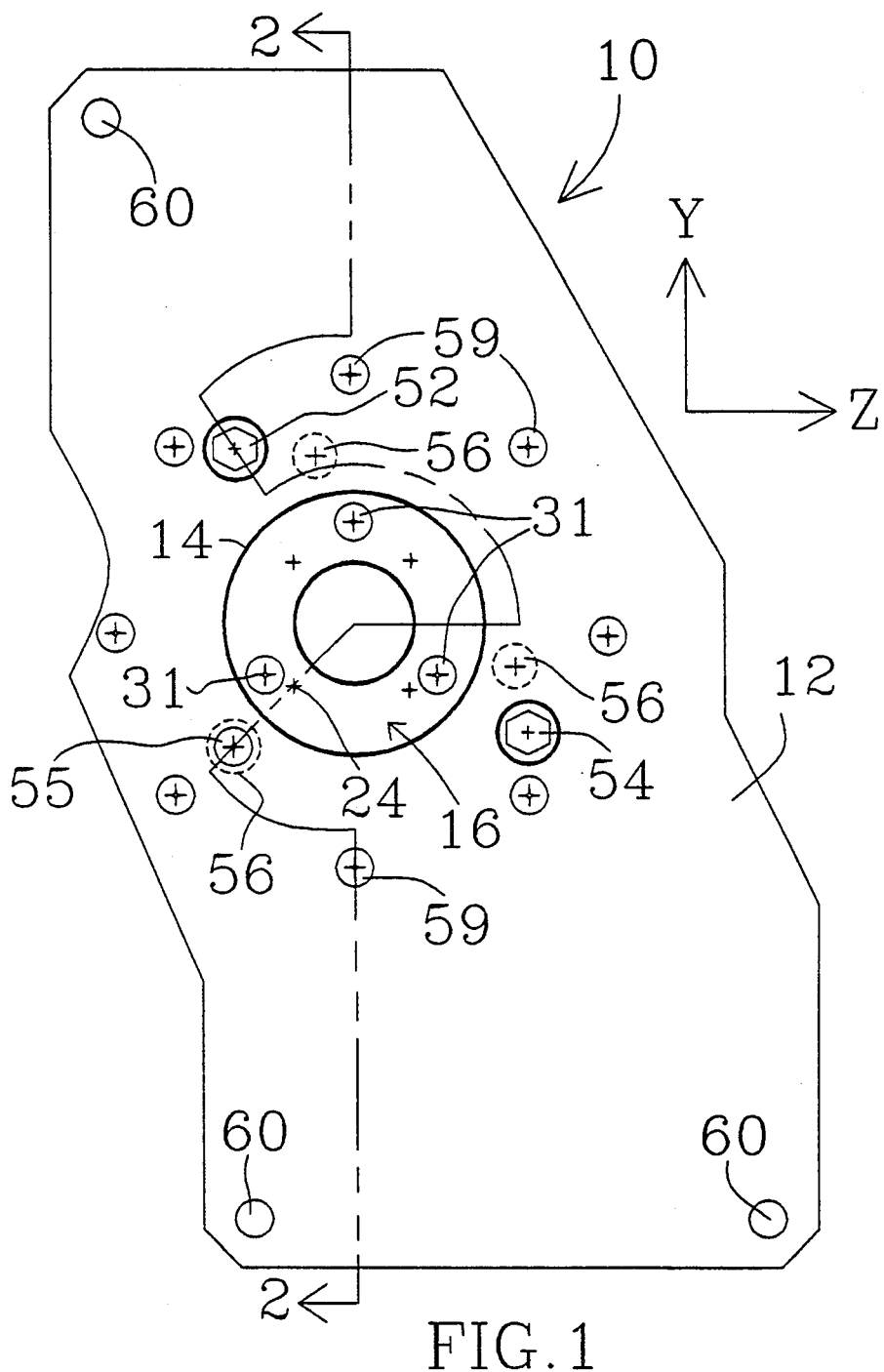
FIG. 1 is a front view of an optic mount according to a preferred embodiment of the invention, taken on the line 1—1 in FIG. 2.

Adjustment of the mount 10 in the Y and Z directions relative to the fixed main plate 12 is achieved by movement of the second plate 34. FIGS. 1 and 3 show a first adjustment screw 52 that acts through a metal ball 53 on an upper part of the plate 34. A second and similar adjustment screw 54 (seen only in FIG. 1) acts through a similar ball on a lower part of the plate 34. The plate 34 is pivotable about a ball and socket joint 55 which is held together by springs 56. The screw 52 serves for adjustment of the alignment in the Y direction and the screw 54 in the Z direction. A further elastomeric O-ring 57 supported in an inwardly facing groove in a collar 58 secured to the main plate 12 by screws 59 acts as a resilient mount to prevent distortion of the sealing O-ring 49 that might otherwise arise due to the weight of the parts and might compromise the pressure seal.

Figure 7:
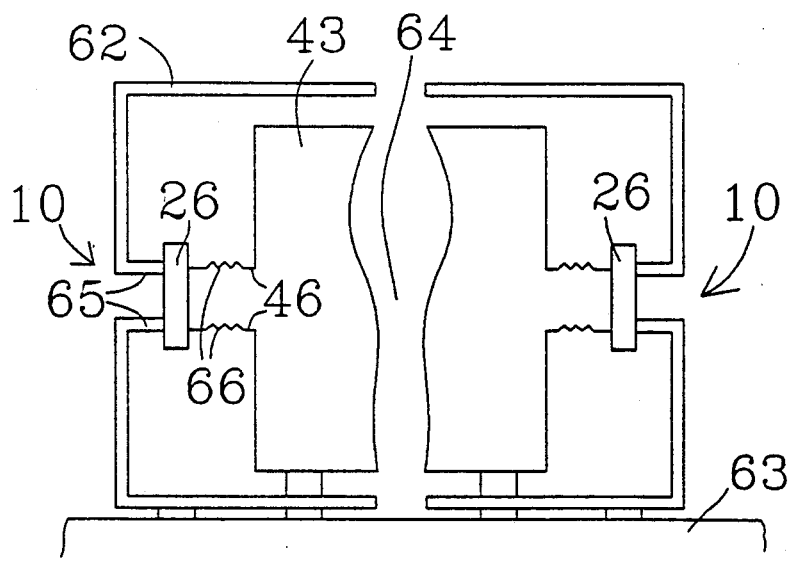
FIG. 7 is a small scale view of the preferred embodiment represented in equivalent form.

The main plate 12 is fixed to three members 60 of a supporting frame 62 that is illustrated diagrammatically in FIG. 7. This view shows the frame 62 mounted on a base 63 that also supports the laser vessel 43. Mirror mounts 10, as illustrated in FIGS. 1-3, are employed at respective ends of the vessel 43 in alignment with each other and with the lasing cavity 64 in the vessel, the two mounts being essentially the same as each other except for the fact that one contains a rear mirror and the other a front mirror. The functional equivalents of the mounts 10 are demonstrated diagrammatically in FIG. 7 which shows the contrast between rigid connections 65 supporting the mirrors 26 on the frame 62 and the yieldable, but nevertheless sealing, connections 66 joining the mirrors 26 to the vessel end sleeves 46.

With the laser shut down and the optic ports depressurized, an unskilled user can readily remove each holder 16 from its mount 10 for cleaning of the inside surfaces 25 of the mirrors 26 by simply unscrewing the screws 31, and can easily reverse this process once the mirrors are ready to be reinstalled. Similarly, the optics can be replaced with new ones, or furthermore, a complete optic holder assembly 16 with mirrors premounted can be installed. In any of these cases, the user will be secure in the knowledge that the mirrors will be returned accurately to their former orientations regardless of any movement of the laser vessel ends resulting from the cooling down and subsequent heating up of the laser vessel or from pressure changes inside the vessel.

When an optic is replaced by a new one, it is important that the wedge angle and the position with respect to the wedge of the means registering the rotational orientation of the new optic be closely similar to these aspects of the replaced optic.

Figure 8:
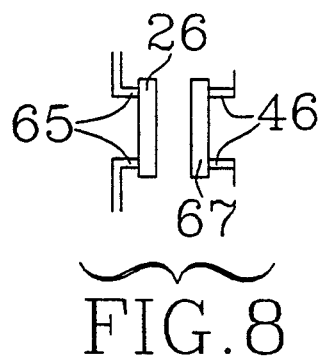
FIG. 8 is a fragment of FIG. 7 showing the principle of an alternative.
Figure 9:
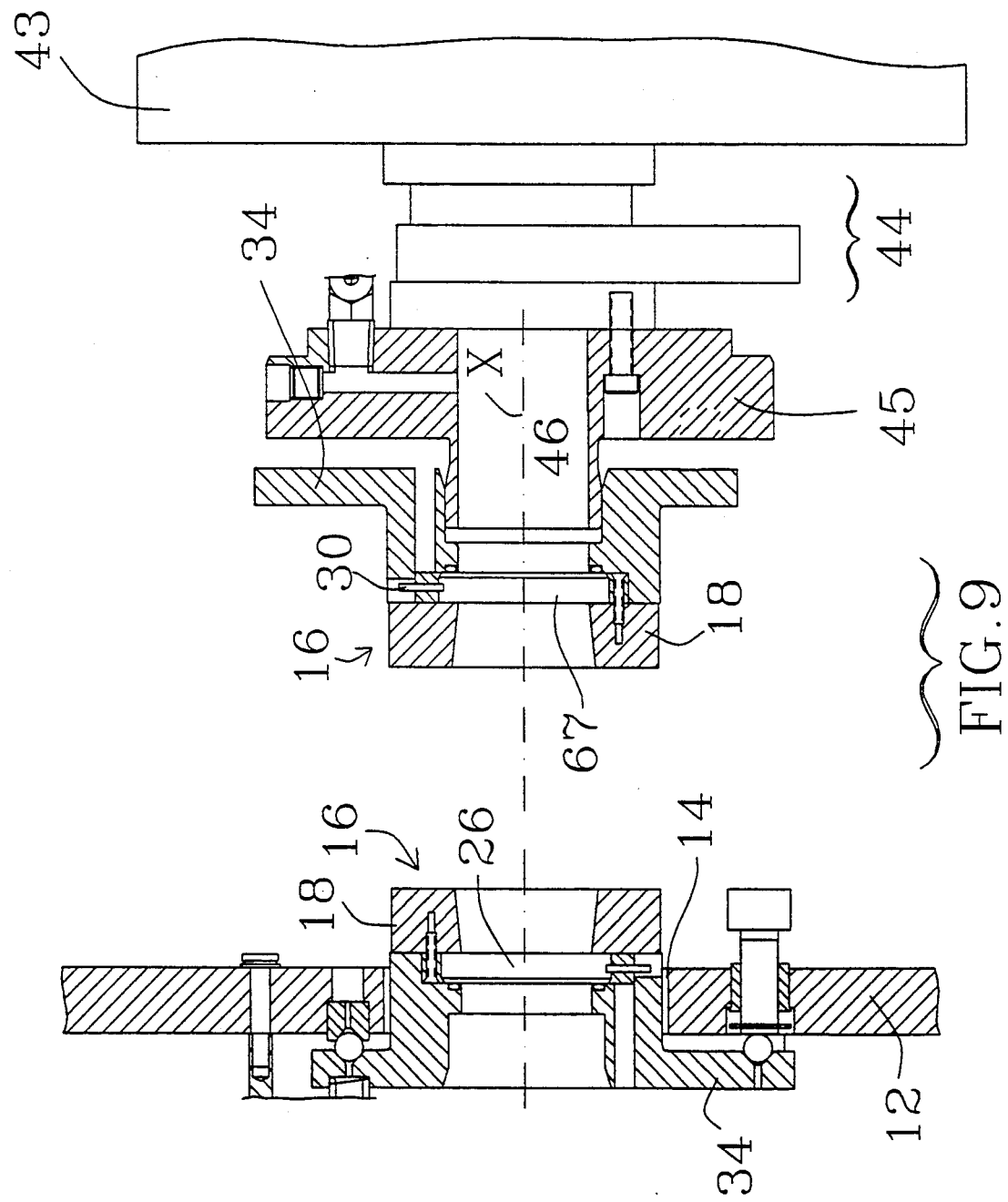
FIG. 9 illustrates how this alternative can be put into practice.

Instead of employing the arrangement shown in FIG. 7, the system can be modified as shown by FIG. 8, namely to employ a window 67 to seal off each end sleeve 46 of the laser vessel, while continuing to mount the mirror 26 on the supporting frame 62 by the rigid connections 65. As indicated above, this use of four optics (two windows and two mirrors) is normally less desirable because it reduces the efficiency of the laser, but nevertheless, if adopted, can utilize the novel optic mount structure described and illustrated herein. For example, as shown on the left of FIG. 9, each mirror 26 can usefully continue to be supported from a frame 34 in an optic holder 16 as in FIG. 2, except that the fitting 45 is now absent. Instead, as seen on the right of FIG. 9, the sleeve 46 of each of these fittings 45 is now rigidly secured to a second plate 34 of an optic mount that is also otherwise mainly as shown in FIG. 2, except that a window 67 now replaces the mirror 26 and the plate 12 with its associated parts for the Y and Z direction adjustments are omitted. The thermal and pressure induced movements of the vessel end sleeves 46 that can now be expected to produce movements of the windows 67 in the Y and Z directions can be tolerated, since these windows perform essentially no reflective function. However, rotation of a window 67 about the X axis is to be avoided, since these windows will normally be wedged to some extent and displacement of the wedge orientation would be detrimental to the laser performance. The features of rotational registration of the optic holder 16 (in this case a window holder) in the optic mount, and the rotational registration of the window 67 in the holder 16, are retained.

A further alternative is to adopt a laser system one end of which is similar to FIG. 7 while the other end is as shown in FIG. 8.

It is important to appreciate that by means of the structure described it becomes possible to ensure that a selected flat reference surface of an optic, e.g. the surface 27 of the mirror 26, is accurately registered relative to a flat rigid metal surface, e.g. the surface 19 of the ring 18, the orientation of which is itself accurately determined relative to a fixed frame. This ensures that a mirror can be removed and either remounted or replaced, with the certainty that the selected reference surface of the mirror is accurately returned to its predetermined orientation. When the mirror is sealing the vessel (FIG. 7), its outer surface is typically the reference surface; when the mirror is not sealing the vessel (FIG. 8), its inner surface (the surface nearer the laser) is typically chosen as the reference surface, a result that can be achieved as shown on the left of FIG. 9 by reversing the mirror mount so that the ring 18 is nearer the laser and the plate 34 is on the side of the mirror remote from the laser.

I claim:

1. An excimer laser assembly comprising
   (a) a laser vessel with a pressurized interior containing a lasing cavity and a pair of mirrors aligned with each other and the cavity and located at opposite ends of the vessel for producing a laser beam;
   (b) a supporting frame; and
   (c) a mount for each mirror, each said mount comprising a main member secured to the supporting frame, and removable and replaceable means for ensuring accurate relocation of a said mirror in a predetermined orientation relative to said main member, said orientation being independent of movement of the vessel ends;
   (d) wherein the means for ensuring accurate relocation of a said mirror in a predetermined orientation relative to the main member comprise a second member on which the mount for the mirror is secured in a fixed orientation, and means for adjusting the position of the second member relative to the main member in two mutually perpendicular directions both perpendicular to the laser beam.

2. An excimer laser assembly according to claim 1, including means sealingly and yieldingly connecting each said mount to a vessel end with an inside surface of the mirror in communication with the interior of the vessel.

3. An excimer laser assembly according to claim 2, wherein at least one of said mirrors has a pair of opposite faces lying in planes slightly inclined to each other to define a wedge shape, and wherein the mount for such wedge shaped mirror includes registration means for so locating the mirror in the mount that the wedge shaped mirror has a predetermined rotational orientation about the axis of the laser beam.

4. An excimer laser assembly according to claim 1, wherein at least one of said mirrors has a pair of opposite faces lying in planes slightly inclined to each other to define a wedge shape, and wherein the mount for such wedge shaped mirror includes registration means for so locating the mirror in the mount that the wedge shaped mirror has a predetermined rotational orientation about the axis of the laser beam.

5. An excimer laser assembly comprising
   (a) a laser vessel with a pressurized interior containing a lasing cavity and a pair of mirrors aligned with each other and the cavity and located at opposite ends of the vessel for producing a laser beam, at least one of said mirrors having a pair of opposite faces lying in planes slightly inclined to each other to define a wedge shape;
   (b) a supporting frame; and
   (c) a mount for each mirror, each said mount comprising a member secured to the supporting frame, and registration means for ensuring accurate location of the wedge shaped mirror in its mount with the wedge shaped mirror having a predetermined rotational orientation about the axis of the laser beam.

6. An excimer laser assembly comprising (a) a laser vessel with a pressurized interior containing a lasing cavity, two pairs of optics comprising a pair of windows located at opposite ends of the vessel for sealing the same and a pair of mirrors located more remote from the vessel than the windows, the mirrors and windows being aligned with each other and the cavity for producing a laser beam;

(b) a supporting frame;

(c) a mount for each mirror, each said mount comprising a main member secured to the supporting frame, and registration means for ensuring accurate location of a said mirror in a predetermined orientation relative to said main member, including means sealingly and yieldingly connecting each said mount to a vessel end whereby said orientation is independent of movement of the vessel ends; and (d) a mount for each window, each such window mount comprising a further main member secured to a respective vessel end, and registration means for ensuring accurate location of a said window in a predetermined orientation relative to said further main member.

7. An excimer laser assembly according to claim 6, wherein at least one of the optics has a pair of opposite faces lying in planes slightly inclined to each other to define a wedge shape, and wherein the mount for such wedge shaped optic includes registration means for so locating the optic in the mount that the wedge shaped optic has a predetermined rotational orientation about the axis of the laser beam.

8. A mirror mount for use with an excimer laser assembly comprising a laser vessel with a pressurized interior containing a lasing cavity and a pair of mirrors aligned with each other and the cavity and located at opposite ends of the vessel for producing a laser beam, and a supporting frame; characterized in that the mount comprises a main member for securing to the supporting frame, and removable and replaceable means for ensuring accurate relocation of a said mirror in a predetermined orientation relative to said member, said orientation being independent of movement of the vessel ends; wherein the means for locating a said mirror in a predetermined orientation relative to said main member comprises a second member pivotally connected to the main member for adjustment about two mutually perpendicular axes that are both perpendicular to the axis of the laser beam.

9. A mount according to claim 8, including means for sealingly and yieldingly connecting the mount to a vessel end with an inside surface of the mirror in communication with the interior of the vessel.

10. A mount according to claim 8, wherein the mirror is in the shape of a wedge, and including registration means for so locating the mirror in the mount that it has a predetermined rotational orientation about the axis of the laser beam.

11. A mount according to claim 8, including a holder removably connected to the second member, said holder including means for maintaining a selected surface of the mirror accurately referenced relative to the second member.

12. A mount according to claim 11, wherein the mirror is in the shape of a wedge and has registration means at a predetermined location on its periphery for engaging registration means on the holder to ensure a predetermined rotational orientation of the mirror relative to the holder about the axis of the laser beam.

13. A mount according to claim 12, including further registration means for rotational orientation of the holder relative to the second member.

14. A mount according to claim 11, wherein said selected reference surface of the mirror is its outer surface.

15. A mount according to claim 11, wherein said selected reference surface of the mirror is its inner surface.

16. A mount according to claim 8, wherein the second member includes a portion supporting axially facing sealing means engaging the inner surface of the mirror.

17. A mount according to claim 16, wherein the second member includes a portion for slidingly and sealingly receiving a sleeve connected to an end of the laser vessel whereby to sealingly and yieldingly connect the second member to said sleeve and hence to said vessel end.

18. An optic mount for use with an excimer laser assembly comprising a laser vessel with a pressurized interior containing a lasing cavity and at least a pair of optics aligned with each other and the cavity and located at opposite ends of the vessel for producing a laser beam; characterized in that at least one of the optics is in the shape of a wedge and that the mount for such wedge shaped optic comprises registration means for locating the optic in the mount in a predetermined rotational orientation about the axis of the laser beam.

19. A mount according to claim 18, wherein the optic is a mirror and the mount includes a member for rigidly securing the mount to a supporting frame.

20. A mount according to claim 18, wherein the optic is a window and the mount includes a member of rigidly securing the mount to a vessel end.

21. A mirror mount for use with an excimer laser assembly comprising a laser vessel with a pressurized interior containing a lasing cavity and a pair of mirrors aligned with each other and the cavity and located at opposite ends of the vessel for producing a laser beam, and a supporting frame; characterized in that the mount comprises a main member for securing to the supporting frame, and registration means for ensuring accurate location of a said mirror in a predetermined orientation relative to said member, including means for sealingly and yieldingly connecting the mount to a vessel end with an inside surface of the mirror in communication with the interior of the vessel whereby said orientation of the mirror relative to said main member is independent of movement of the vessel end.

22. A mount according to claim 21, wherein the mirror is in the shape of a wedge, and including registration means for so locating the mirror in the mount that it has a predetermined rotational orientation about the axis of the laser beam.

23. A mount according to claim 21, including means for locating the mirror in a predetermined orientation relative to said main member, said locating means comprising a second member pivotally connected to the main member for adjustment about two mutually perpendicular axes that are both perpendicular to the axis of the laser beam.

24. An excimer laser assembly comprising (a) a laser vessel with a pressurized interior containing a lasing cavity and a pair of a mirrors aligned with each other and the cavity and located at opposite ends of the vessel for producing a laser beam;

(b) a supporting frame; and (c) a mount for each mirror, each said mount comprising a main member secured to the supporting frame, and registration means for ensuring accurate location of a said mirror in a predetermined orientation relative to said main member, including means sealingly and yieldingly connecting each said mount to a vessel end with an inside surface of a mirror in communication with the interior of the vessel whereby said orientation of the mirror relative to the main member is independent of movement of the vessel end.

25. An excimer laser assembly according to claim 24, wherein at least one of said mirrors has a pair of opposite faces lying in plane slightly inclined to each other to define a wedge shape, and wherein the mount for such wedge shaped mirror includes registration means for so locating the mirror in the mount that the wedged shaped mirror has a predetermined rotational orientation about the axis of the laser beam.

26. An excimer laser assembly according to claim 24, including means for ensuring accurate relocation of at least one of said mirrors in a predetermined orientation relative to the main member, said locating means comprising a second member on which the mount for the mirror is secured in a fixed orientation, and means for adjusting the position of the second member relative to the main member in two mutually perpendicular directions both perpendicular to the laser beam.

* * * * *